June 5, 1962
A. L. DE SAEDELEER
3,037,511
APPARATUS FOR THE HUMIDIFICATION OF VEGETABLE
MATTER, MORE ESPECIALLY TOBACCO
Filed Aug. 13, 1958
2 Sheets-Sheet 1
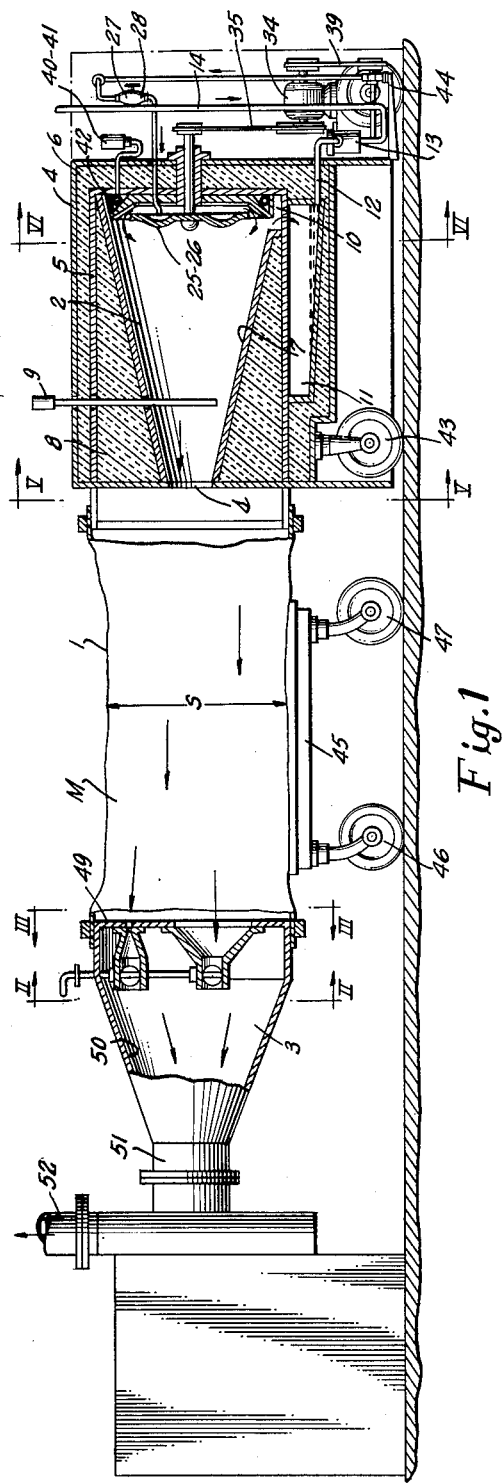
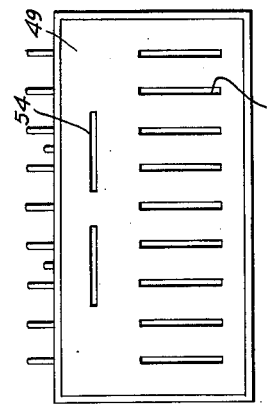
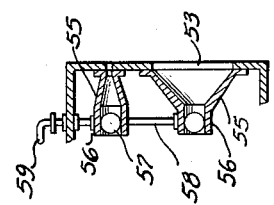
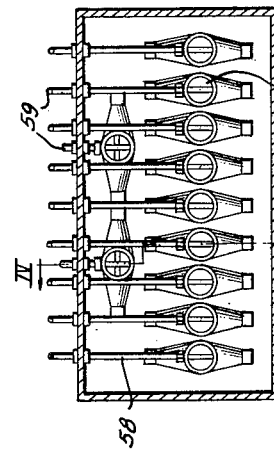
INVENTOR
A. L. De Saedeleer
BY Richards & Geier
ATTORNEYS June 5, 1962 A. L. DE SAEDELEER 3,037,511
APPARATUS FOR THE HUMIDIFICATION OF VEGETABLE
MATTER, MORE ESPECIALLY TOBACCO
Filed Aug. 13, 1958 2 Sheets-Sheet 2
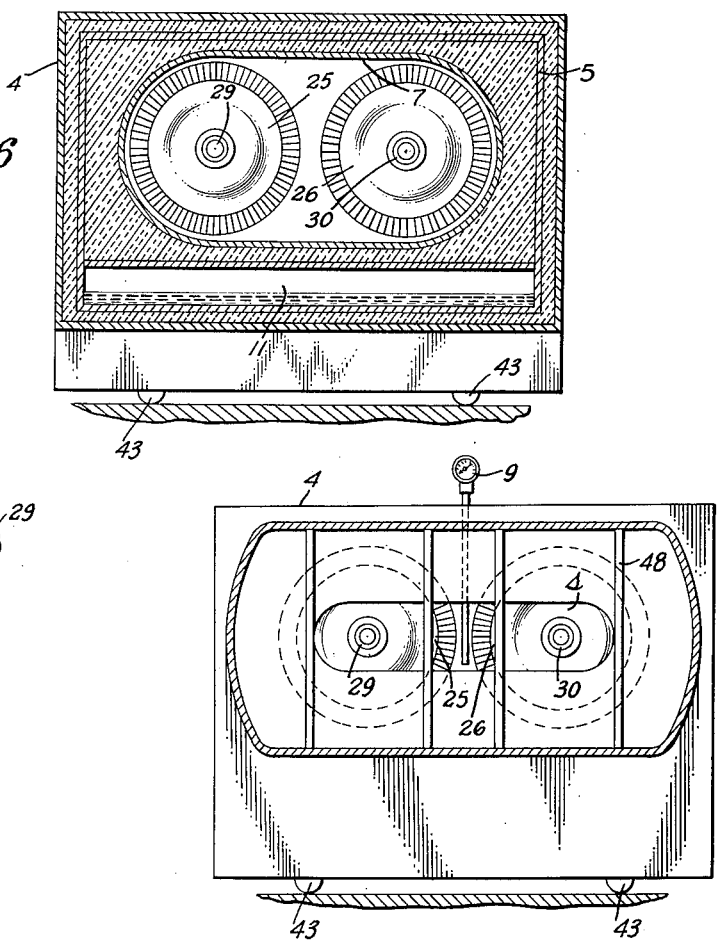
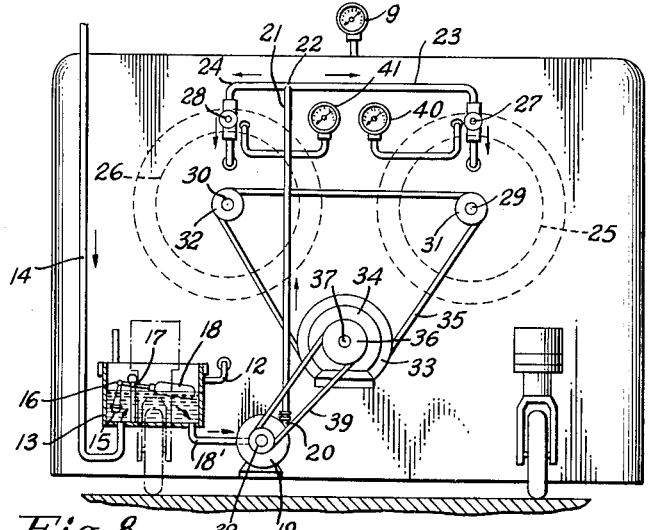
INVENTOR
A.L. De Saedeleer
BY Richards & Geier
ATTORNEYS

United States Patent Office 3,037,511
Patented June 5, 1962

3,037,511
APPARATUS FOR THE HUMIDIFICATION OF VEGETABLE MATTER, MORE ESPECIALLY TOBACCO
Albert L. de Saedeleer, 144 Bouwelsteinweg, Nijlen, Belgium
Filed Aug. 13, 1958, Ser. No. 754,754
Claims priority, application Belgium Aug. 21, 1957
8 Claims. (Cl. 131—134)

The invention relates to improvements in a humidification apparatus, more especially for tobacco, in which the mass of tobacco is subjected to the influence of a current of compressed air charged with water-vapour and also to that of a zone of diminished pressure.

The operation of the improved apparatus consists in increasing progressively the speed, that is to say the pressure of the air charged with water-vapour before contact with the mass of tobacco, in placing said air charged with water-vapour in contact with the mass of tobacco through a surface smaller than that of the cross-section of said mass of tobacco, and in providing means in the form of narrow apertures for extracting the air after it has passed through said mass of tobacco.

Said improvements relating to the apparatus will be more clearly understood from the detailed description of an embodiment offered by way of example of a non-limitative character. In the description which will now be given with reference to the accompanying drawings:

FIGURE 1 is a side-elevation view partly in longitudinal section showing an improved apparatus according to the invention;

FIGURE 2 is a section on the line II—II of FIGURE 1;

FIGURE 3 is a section on the line III—III of FIGURE 1;

FIGURE 4 is a section on the line IV—IV of FIGURE 2;

FIGURE 5 is a section on the line V—V of FIGURE 1;

FIGURE 6 is a section on the line VI—VI of FIGURE 1;

FIGURE 7 is a partial longitudinal section of the front portion showing an additional feed device;

FIGURE 8 is a view of the front of the apparatus shown diagrammatically.

In this embodiment the process chamber proper 1 provided with resilient walls is located between the pressurised chamber 2 and the vacuum chamber 3. The pressurised chamber 2 is enclosed in a double wall 4, 5, a quantity of heat-insulating substance 6 being inserted between these walls. Within the chamber 5 a wall 7 of conical construction is fitted which encloses the actual pressure chamber 2, the section of which thus decreases progressively in direction of the process chamber 1, whereby the surface area of the exit $s$ of this conical chamber is considerably smaller than the cross-section S of the mass of tobacco M to be treated.

The area bounded by the inner walls 5, 7 is likewise filled-in with a quantity of heat-insulating material 8.

The temperature of the chamber 2 is controlled by a thermometer 9.

The lower part of the chamber 2 is connected by way of a passage 10 with a receptacle 11 to receive condensation. A pipe 12 leading from this receptacle 11 enters a tank 13 the base of which is connected by way of a pipe 14 to a source of water supply (not illustrated). The supply of water is controlled by a valve element 15 mounted at the extremity of an arm 16 pivotable on a point 17 and provided at its other extremity with a float 18 to provide a constant-level cistern. A pipe 18' leads from the bottom of the cistern 13 to the input side of a pump 19, the output side 20 of which is extended by the pipe 21. Said pipe 21 terminates in a T-connection 22 providing two branch pipes 23 and 24 respectively. Each branch extends to a point in proximity to a steamer disc 25 or as the case may be 26, and is regulated by a valve 27, 28. The steamer discs 25, 26 are each keyed to a shaft 29, 30 respectively; on each shaft a pulley 31, 32 is mounted, said pulleys being driven from the pulley 33 of an electric motor 34 by a belt 35. A second pulley 36 fitted to the shaft 37 of said electric motor is connected to the pulley 38 of the above-mentioned pump 19 by a belt 39.

All moving parts are thus duly synchronised and controlled from the same electric motor 34.

The atmosphere surrounding the atomiser discs 25, 26 is controlled by thermometers 40, 41 respectively. The discs are heated by electrical resistances, for example at 42, provided in proximity to said atomiser discs.

This entire portion of the apparatus forming the atomiser and pressure chamber is constructed in the form of a trolley mounted on ground wheels 43, 44 etc.

The mass of tobacco to be processed is carried on the trolley 45 mounted on ground wheels 46, 47 etc. Bars 48 are fitted opposite the surface aperture $s$ of said pressure chamber. The vacuum chamber may be advantageously constructed in the following manner: a front wall 49 is connected to a wall 50 limiting the chamber 3 in such a manner that its section decreases progressively as far as a tubular element 51 connected to an exhaust vent 52. On the forward wall 49 groups 53, 54 of long, narrow slots are distributed over the entire surface area. On the rear face of said wall 49 said slots 53, 54, as shown particularly in FIGURES 2 and 4, are backed by tubes 55, the longitudinal section of which decreases progressively; the tubes 55 terminate in nozzles 56 within which are situated valve members 57, the control rod 58 of which projects through the upper part of the vacuum chamber 3 and terminates in a control lever 59. All apertures 53, 54 are constructed in this manner.

A blower or any other means for producing the vacuum in the chamber 3 may be located in the exhaust vent 52 or at any other suitable point.

In the apparatus thus described the air strongly charged with water-vapour moves vigorously at right-angles to the rotating discs 25, 26 and passes through the chamber 2 along the wall 7 of conical construction which causes a progressive increase in speed and pressure. Under these conditions of speed and pressure the air strongly charged with water-vapour reaches the mass of tobacco M by way of a surface $s$ considerably smaller than the cross-section S of said mass of tobacco.

According to the nature of the tobacco to be processed, the form in which it appears and the results desired, the valves 57 are adjusted to admit in a certain manner the air charged with water-vopour to circulate through the said mass M until this mass is finally permeated with moisture in an evenly controlled homogeneous manner.

It is manifest that a wide variety of modifications may be brought to the components which have just been described, either by changing the form and dimensions of these components or by altering their relative positions. Likewise, these elements may be replaced by any equivalent element or element of equivalent function.

Moreover, it is also possible to add to the essential elements described above any kind of accessory whatsoever. For example, in the vicinity of the atomiser discs 25, 26 distributors 60 may be added, as shown diagrammatically in FIGURE 7, for supplying water, water-vapour, gas or any other fluid or substance compatible with the treatment in question.

The invention comprises any such embodiments and modifications whatsoever in as far as the conditions are fulfilled of the improved process and apparatus hereinbefore described.

What I claim is:

1. Apparatus for humidifying plants, particularly tobacco, comprising means forming a pressurized chamber and comprising a rear wall, a smaller perforated front wall and a frusto-conical side wall between said rear wall and said front wall, whereby said pressurized chamber is enclosed by said walls and has a progressively decreasing cross-section, said rear wall having at least one recessed portion, a profiled vaporizing disc in said recessed portion, a driving shaft extending through said rear wall and driving said disc, an electrical heating resistance located in said recessed portion adjacent said disc, a branch pipe extending through said rear wall and into said recessed portion, a water pump connected with said branch pipe, means forming a vacuum chamber, resilient means forming a process chamber located between said pressurized chamber and said vacuum chamber, said three chambers having the same horizontal axis, said perforated wall separating said process chambers from said pressurized chamber, an exhaust vent connected to said vacuum chamber, and means controlling the passage of vapor in said vacuum chamber.

2. Apparatus for humidifying plants, particularly tobacco, comprising means forming a pressurized chamber and comprising a rear wall, a smaller perforated front wall and a frusto-conical side wall between said rear wall and said front wall, whereby said pressurized chamber is enclosed by said walls and has a progressively decreasing cross-section, said rear wall having at least one recessed portion, a profiled vaporizing disc in said recessed portion, a driving shaft extending through said rear wall and driving said disc, a pulley keyed to said shaft, a water pump, another driving shaft driving said water pump, another pulley keyed to said other shaft, an electric motor, a belt drive operatively connected with said pulleys, a branch pipe extending through said rear wall and into said recessed portion and connected with said water pump, whereby the supply of water from said water pump is synchronized with the rotation of said disc, an electrical heating resistance located in said recessed portion adjacent said disc, means forming a vacuum chamber, resilient means forming a process chamber located between said pressurized chamber and said vacuum chamber, said three chambers having the same horizontal axis, said perforated wall separating said process chamber from said pressurized chamber, an exhaust vent connected to said vacuum chamber, and means controlling the passage of vapor in said vacuum chamber.

3. Apparatus for humidifying plants, particularly tobacco, comprising means forming a pressurized chamber and comprising a rear wall, a smaller perforated front wall and a frusto-conical side wall between said rear wall and said front wall, whereby said pressurized chamber is enclosed by said walls and has a progressively decreasing cross-section, said rear wall having at least one recessed portion, said recessed portion having an annular conical surface and projections upon said surface, a profiled rotary disc located in said recessed portion and projecting water upon said annular conical surface, means driving said disc, an electrical heating resistance located in said recessed portion adjacent said disc, a pump supplying water to said disc, means forming a vacuum chamber, resilient means forming a process chamber located between said pressurized chamber and said vacuum chamber, said three chambers having the same horizontal axis, a perforated wall separating said process chamber from said pressurized chamber, an exhaust vent connected to said vacuum chamber, and means controlling the passage of vapor in said vacuum chamber.

4. Apparatus for humidifying plants, particularly tobacco, comprising means forming a pressurized chamber and comprising a rear wall, a smaller perforated front wall and a frusto-conical side wall between said rear wall and said front wall, whereby said pressurized chamber is enclosed by said walls and has a progressively decreasing cross-section, said rear wall having at least one recessed portion, said recessed portion having an annular conical surface and projections upon said surface, a rotary disc having an annular groove and a concave surface adjacent said annular groove, said disc projecting water upon the annular conical surface of said recessed portion, means driving said disc, an electrical heating resistance located in said recessed portion adjacent said disc, a pump supplying water to said disc, means forming a vacuum chamber, resilient means forming a process chamber located between said pressurized chamber and said vacuum chamber, said three chambers having the same horizontal axis, a perforated wall separating said process chamber from said pressurized chamber, an exhaust vent connected to said vacuum chamber, and means controlling the passage of vapor in said vacuum chamber.

5. Apparatus for humidifying plants, particularly tobacco, comprising means forming a pressurized chamber and comprising a rear wall, a smaller perforated front wall, a frusto-conical side wall between said rear wall and said front wall, whereby said pressurized chamber is enclosed by said walls and has a progressively decreasing cross-section, another wall enclosing said frusto-conical wall, and heat insulation between said other wall and said frusto-conical wall, vaporizing means located in said pressurized chamber upon said rear wall thereof, means forming a vacuum chamber, resilient means forming a process chamber located between said pressurized chamber and said vacuum chamber, said three chambers having the same horizontal axis, heating means adjacent said vaporizing means, a perforated wall separating said process chamber from said pressurized chamber, an exhaust vent connected to said vacuum chamber, and means controlling the passage of vapor in said vacuum chamber.

6. Apparatus for humidifying plants, particularly tobacco, comprising means forming a pressurized chamber and comprising a rear wall, a smaller perforated front wall and a frusto-conical side wall between said rear wall and said front wall, whereby said pressurized chamber is enclosed by said walls and has a progressively decreased cross-section, means forming a vacuum chamber, resilient means forming a process chamber located between said pressurized chamber and said vacuum chamber, said three chambers having the same horizontal axis, said perforated wall separating said process chamber from said vacuum chamber, an exhaust vent connected to said vacuum chamber, and means controlling the passage of vapor in said vacuum chamber.

7. Apparatus for humidifying plants, particularly tobacco, comprising means forming a pressurized chamber of progressively decreasing cross-section, means forming a vacuum chamber, resilient means forming a process chamber located between said pressurized chamber and said vacuum chamber, said three chambers having the same horizontal axis, vaporizing means located in said pressurized chamber, a pump supplying water to said vaporizing means, heating means adjacent said vaporizing means, a perforated wall separating said process chamber from said pressurized chamber, another wall separating said process chamber from said vacuum chamber, said other wall having a lower row of vertical slots and an upper row of alined horizontal slots, said slots permitting the passage of air and preventing the passage of tobacco, an exhaust vent connected to said vacuum chamber, and means controlling the passage of vapor in said vacuum chamber.

8. Apparatus for humidifying plants, particularly tobacco, comprising means forming a pressurized chamber of progressively decreasing cross-section, means forming a vacuum chamber, resilient means forming a process chamber located between said pressurized chamber and said vacuum chamber, said three chambers having the same horizontal axis, vaporizing means located in said pressurized chamber, a pump supplying water to said vaporizing means, heating means adjacent said vaporizing means, a perforated wall separating said process chamber from said pressurized chamber, another wall separating said process chamber from said vacuum chamber, said other wall having a lower row of vertical slots and an upper row of alined horizontal slots, said slots permitting the passage of air and preventing the passage of tobacco, tubes of decreasing cross-section located in said vacuum chamber and having larger cross-sectional ends communicating with said slots, and smaller cross-sectional ends constituting nozzles, valves located in said smaller cross-sectional ends, control rods connected with said valves and extending outside of said vacuum chamber, and an exhaust vent connected to said vacuum chamber.

References Cited in the file of this patent
UNITED STATES PATENTS

| | | |
|---|---|---|
| 1,585,476 | Febles | May 18, 1926 |
| 1,640,298 | Sartig | Aug. 23, 1927 |
| 1,693,989 | Milligan | Dec. 4, 1928 |
| 1,865,154 | Touton | June 28, 1932 |
| 1,958,863 | Rapeanu | May 15, 1934 |
| 2,229,943 | Touton | Jan. 28, 1941 |
| 2,832,353 | Doyle | Apr. 29, 1958 |